March 25, 1969  H. E. BOLDEN  3,434,780
EYEGLASS FRAME WITH PIVOTALLY MOUNTED LENS
Filed Sept. 13, 1967
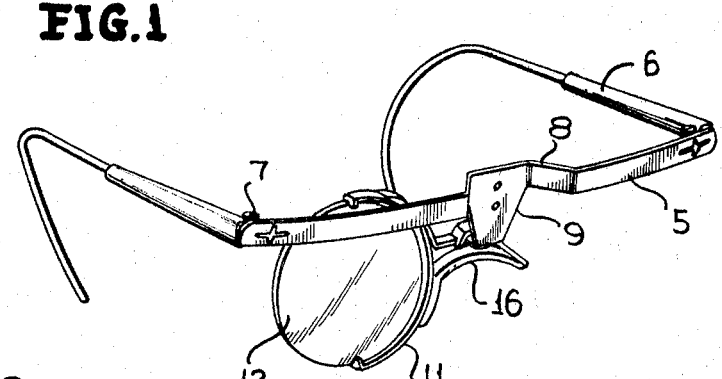
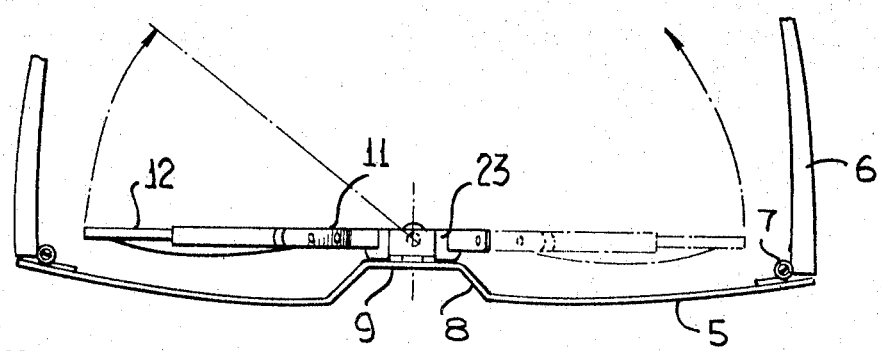
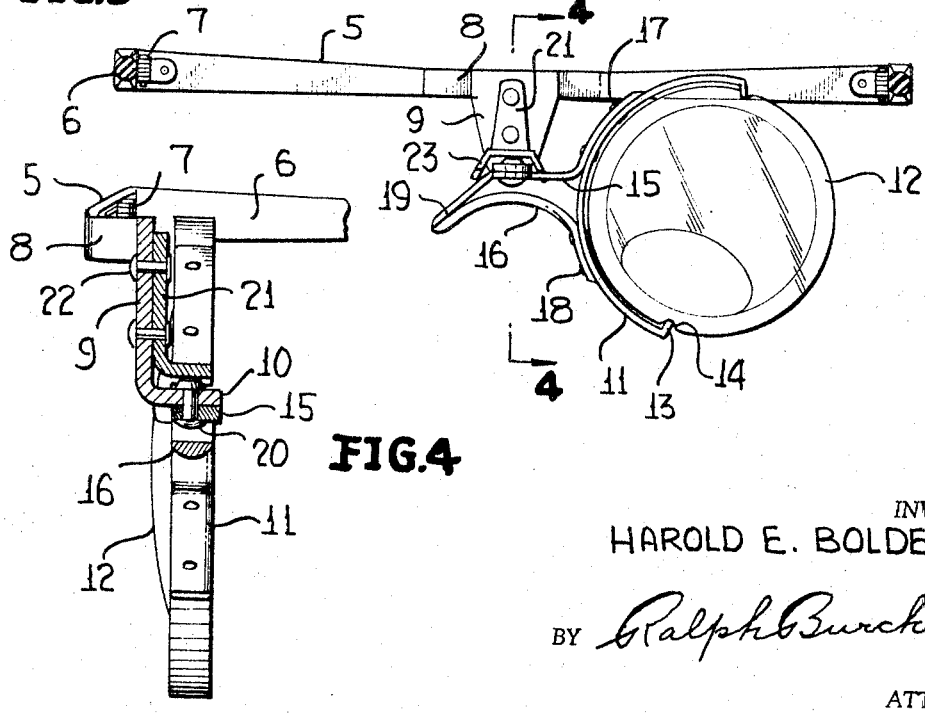
INVENTOR
HAROLD E. BOLDEN
BY Ralph Burch
ATTORNEY

United States Patent Office 3,434,780
Patented Mar. 25, 1969

3,434,780
EYEGLASS FRAME WITH PIVOTALLY
MOUNTED LENS
Harold E. Bolden, 2906 Maple Road,
Rome, Ga. 30161
Filed Sept. 13, 1967, Ser. No. 667,449
Int. Cl. G02c 1/04
U.S. Cl. 351—41
6 Claims

ABSTRACT OF THE DISCLOSURE

An eyeglass frame having a single lens frame removably supporting a lens, the lens frame being pivotally mounted in the center of the eyeglass frame so it may swing to cover either eye of the user.

My invention relates to an eyeglass frame and more particularly to a frame for supporting a single lens which may be adjusted to cover either eye of a person.

It is an object of the invention to provide an eyeglass frame having a lens frame pivotally mounted in the center of the eyeglass frame to swing in opposite directions to cover either eye.

A further object of the invention resides in providing a lens frame having projecting arms for pivotally attaching the frame to the center of an eyeglass frame, the arms bridging the nose of the wearer to support the eyeglass frame.

Other objects and advantages of the invention will be apparent during the course of the following specification.

In the accompanying drawing forming a part of this specification and wherein like numerals are employed to designate like parts throughout the same;

FIG. 1 is a perspective view of the invention,
FIG. 2 is a top view of the same,
FIG. 3 is a rear view of the same, and
FIG. 4 is a section taken on lines 4—4 of FIG. 3.

Referring to the drawing, the eyeglass frame comprises a bar 5 adapted to extend across the forehead of the face having a conventional temple 6 pivotally attached to each end of the bar, as at 7, for attaching the bar to the ears of a person. The bar 5, intermediate its length, is offset inwardly, as at 8, the offset portion having an extension 9 projecting downwardly with its lower end 10 bent inwardly at right angles.

The lens frame comprises a semi-circular resilient band 11 adapted to extend around the periphery of the lens 12, the ends of the band being bent inwardly to form lugs 13 adapted to seat in notches 14 formed in the edge of the lens. The ends of the band 11 may be spread apart to insert or remove the lens. A pair of arms 15 and 16 are attached to the band 11, as at 17 and 18 and extend radially from the band 11 in spaced relation with their free ends bent into contacting relation and secured together, as at 19. The lower arm 16 is curved upwardly to bridge the nose of the face and the upper arm 15 contacts the lower end 10 of the extension 9 and is pivotally secured thereto by pivot pin 20. A stop for holding the lens frame in its adjusted position is attached to the back of the extension 9 and consists of an angle bracket 21 having one end attached to the back of extension 9, as at 22, and its other end extending over the pivot pin 20 and provided at its sides with downwardly bent members 23 having abutments for engagement with the arm 15 to limit the pivotal movement of the lens frame in an outward direction.

In operation, the lens frame may be swung in either direction towards opposite ends of the bar 5 so that the lens may be positioned in front of either eye. The lens may be easily removed from the lens frame when swinging the lens from one eye to the other so that the lens can be reversed to position the concaved side of the lens in facing relation to the eye. Thus, if a person has to wear a bandage over one eye following a cataract or other operation, my improved spectacle frame permits a lens to be easily adjusted to wear over the other eye without any inconvenience to the person.

Having thus described my invention, I claim:
1. An eyeglass frame comprising a bar adapted to extend across the forehead of a face, said bar being offset inwardly, intermediate its length, with a depending extension, and a lens frame having arms pivotally mounted on said extension and bridging the nose of the wearer, said lens frame being mounted to swing towards either end of said bar.
2. An eyeglass frame as described in claim 1 including means for holding said lens frame in parallel relation to the ends of said bar.
3. An eyeglass frame as described in claim 1 including means carried by said depending extension for engaging the said arms of the lens frame to hold said lens in parallel relation to the ends of said bar.
4. An eyeglass frame as described in claim 1 wherein said lens frame is a semi-circular resilient band having inwardly bent lugs at its ends adapted to engage notches formed in the periphery of the lens.
5. An eyeglass frame as described in claim 1 wherein said arms of the lens frame extend radially from the frame with one of said arms pivotally mounted on the offset portion of said bar and the other arm being curved upwardly to bridge the nose of the wearer.
6. An eyeglass frame as described in claim 5 including means for limiting the pivotal movement of said lens frame.

References Cited

UNITED STATES PATENTS 3,339,206   9/1967   Daley _____ 351—41 X

FOREIGN PATENTS 747,422   4/1956   Great Britain.
286,932   3/1928   Great Britain.

OTHER REFERENCES

The Optics Journal and Review of Optometry: (Class 351–41) vol. LXXXVIII, issue 9, p. 66, publ. May 1, 1951.

DAVID SCHONBERG, *Primary Examiner.*

R. L. SHERMAN, *Assistant Examiner.*

U.S. Cl. X.R.

351—59, 106